United States Patent
Woodman et al.

(10) Patent No.: US 7,318,498 B2
(45) Date of Patent: Jan. 15, 2008

(54) DECORATIVE INTERIOR SOUND ABSORBING PANEL

(75) Inventors: Daniel Scott Woodman, Lynchburg, VA (US); Huda Abdul Jerri, Lynchburg, VA (US); Venkat Krishna Raghavendran, Forest, VA (US); Jesse Guy Hipwell, Grand Blanc, MI (US)

(73) Assignee: Azdel, Inc., Shelby, NC (US)

( * ) Notice: Subject to any disclaimer, the term of this patent is extended or adjusted under 35 U.S.C. 154(b) by 265 days.

(21) Appl. No.: 10/820,205

(22) Filed: Apr. 6, 2004

(65) Prior Publication Data

US 2005/0217932 A1 Oct. 6, 2005

(51) Int. Cl.
*E04B 1/99* (2006.01)
*E04B 1/84* (2006.01)

(52) U.S. Cl. .............. 181/290; 181/284; 181/286; 181/294

(58) Field of Classification Search ............ 181/290, 181/294, 286, 204, 205, 210; 296/39.6; 180/69.22, 180/69.23
See application file for complete search history.

(56) References Cited

U.S. PATENT DOCUMENTS

| 4,476,183 | A | * | 10/1984 | Holtrop et al. ............ 442/372 |
|---|---|---|---|---|
| 4,828,910 | A | * | 5/1989 | Haussling .................. 442/391 |
| 4,840,832 | A | * | 6/1989 | Weinle et al. ............... 428/156 |
| 4,940,629 | A | * | 7/1990 | Weber et al. ............... 428/213 |
| 5,387,382 | A | * | 2/1995 | Fottinger et al. ........... 264/113 |
| 5,536,556 | A | * | 7/1996 | Juriga ........................ 428/138 |
| 5,565,259 | A | * | 10/1996 | Juriga ........................ 428/138 |
| 5,817,408 | A | * | 10/1998 | Orimo et al. ................ 428/218 |
| 5,854,149 | A |  | 12/1998 | Nagayama et al. |
| 5,908,524 | A |  | 6/1999 | Masui et al. |
| 5,981,046 | A |  | 11/1999 | Masui et al. |
| 6,150,287 | A | * | 11/2000 | Boyd et al. ................... 442/32 |
| 6,214,456 | B1 | * | 4/2001 | Boyd et al. ............... 428/317.1 |
| 6,368,702 | B1 | * | 4/2002 | Erickson .................. 428/292.1 |
| 6,436,854 | B1 | * | 8/2002 | North et al. ................... 442/58 |
| 6,631,785 | B2 | * | 10/2003 | Khambete et al. .......... 181/290 |
| 2001/0036788 | A1 | * | 11/2001 | Sandoe et al. ............. 442/389 |
| 2004/0216949 | A1 | * | 11/2004 | Tompson et al. ........... 181/204 |

FOREIGN PATENT DOCUMENTS

EP 0 758 577 B1 5/2001

* cited by examiner

*Primary Examiner*—Lincoln Donovan
*Assistant Examiner*—Jeremy Luks
(74) *Attorney, Agent, or Firm*—Armstrong Teasdale LLP

(57) ABSTRACT

A multi-layered fiber reinforced thermoplastic sound absorbing panel includes a porous fiber reinforced thermoplastic core layer having a first surface and a second surface, and includes a thermoplastic material and from about 20 weight percent to about 80 weight percent fibers, a tie layer covering the second surface of the core layer and including a thermoplastic material, and a barrier layer covering the tie layer. The barrier layer includes a thermoplastic material having a melting temperature higher than the melting temperature of the core layer thermoplastic material. The tie layer bonds the barrier layer to the core layer. The panel also includes a non-woven layer including a fabric bonded to the barrier layer. The non-woven layer forms an outer surface of the panel.

24 Claims, 1 Drawing Sheet

DECORATIVE INTERIOR SOUND ABSORBING PANEL

BACKGROUND OF THE INVENTION

This invention relates generally to fiber reinforced thermoplastic polymer sheets, and more particularly to decorative multi-layer structures containing porous fiber reinforced thermoplastic polymer sheets.

Porous fiber reinforced thermoplastic sheets have been described in U.S. Pat. Nos. 4,978,489 and 4,670,331 and are used in numerous and varied applications in the product manufacturing industry because of the ease molding the fiber reinforced thermoplastic sheets into articles. Known techniques, for example, thermo-stamping, compression molding, and thermoforming have been used to successfully form articles from fiber reinforced thermoplastic sheets.

Porous fiber reinforced thermoplastic sheets are sometimes formed into decorative interior sound absorbing panels for use in the interior of automobiles, mass transit vehicles, and buildings including commercial buildings and private buildings. These interior sound absorbing panels typically include a decorative layer on one side for aesthetics. To achieve the greatest percentage of sound absorption at frequencies less than 10,000 hertz, air is permitted to flow into the porous fiber reinforced sheet. In certain automotive market segments, sound absorbing panels, for example, headliners, are made air impermeable to preclude the preferential deposition of cigarette smoke and ash in the panel where the opposite side of the panel is open for air circulation.

Noise problems can occur when design clearances between the airflow terminating layer and the sound absorbing panel's supporting structure are small. Vibrations occurring to the sound absorbing panel can create undesirable noise caused by the panel contacting the support structure. One way that has been used to reduce undesirable noise is to increase the design clearance between the air terminating layer and the panel support structure. However, this approach can require additional design costs and tooling modifications. It also reduces the size of the interior compartment of an automobile.

Also, adhesive bonding of additional components to the airflow terminating layer can present adhesion problems. The shear strength at the adhesive bond line during and after exposure to heat aging can become insufficient to maintain a desirable bond strength. Scoring the airflow terminating layer has been used to increase bond strength but the scoring can lesson the effectiveness of the airflow terminating layer and causes increased production costs. Also, a two step adhesive process is sometimes used where the airflow terminating layer is primed or chemically treated before the adhesive application.

BRIEF DESCRIPTION OF THE INVENTION

In one aspect, a multi-layered fiber reinforced thermoplastic sound absorbing panel is provided. The panel includes a porous fiber reinforced thermoplastic core layer having a first surface and a second surface, and including a thermoplastic material and from about 20 weight percent to about 80 weight percent fibers, a tie layer covering the second surface of the core layer and including a thermoplastic material, and a barrier layer covering the tie layer. The barrier layer includes a thermoplastic material having a melting temperature higher than the melting temperature of the core layer thermoplastic material. The tie layer bonds the barrier layer to the core layer. The panel also includes a fabric layer including at least one of a non-woven fabric and a woven fabric bonded to the barrier layer. The fabric layer forms an outer surface of the panel.

In another aspect, a composite sheet is provided that includes a permeable core comprising discontinuous fibers bonded together with a thermoplastic resin. The permeable core has a density from about 0.2 gm/cc to about 1.8 gm/cc, and includes a first surface and a second surface. The composite sheet also includes a barrier layer covering the second surface of the permeable core, and a fabric layer comprising at least one of a non-woven fabric and a woven fabric bonded to the barrier layer with the fabric layer forming an outer surface of the composite sheet.

In another aspect, a method of manufacturing a porous fiber-reinforced thermoplastic sheet is provided. The method includes providing a porous fiber-reinforced thermoplastic sheet having a first and a second surface and comprising at least one porous core layer comprising a thermoplastic material and from about 20 weight percent to about 80 weight percent fibers, bonding a barrier layer to the second surface of the porous fiber-reinforced thermoplastic sheet, and bonding a fabric layer to the barrier layer.

DETAILED DESCRIPTION OF THE INVENTION

A decorative sound absorbing panel for use in the interior of automobiles, mass transit vehicles, and buildings including commercial buildings and private buildings is described in detail below. The decorative sound absorbing panel is a multi-layer laminate containing an air permeable decorative layer, an air permeable thermoplastic adhesive layer, an air permeable porous fiber reinforced thermoplastic composite layer, a tie layer, an air impermeable barrier layer, and an air permeable fabric layer. The decorative sound absorbing panel provides for lower system costs associated with molding the decorative sound absorbing panel. Total system cost reductions are achieved because the decorative sound absorbing panel permits the use of lower cost adhesives for the attachment of other components to the panel and the elimination of secondary operations and associated fixture and labor costs that are usually associated with attaching components to known sound absorbing panels.

Figure 1:
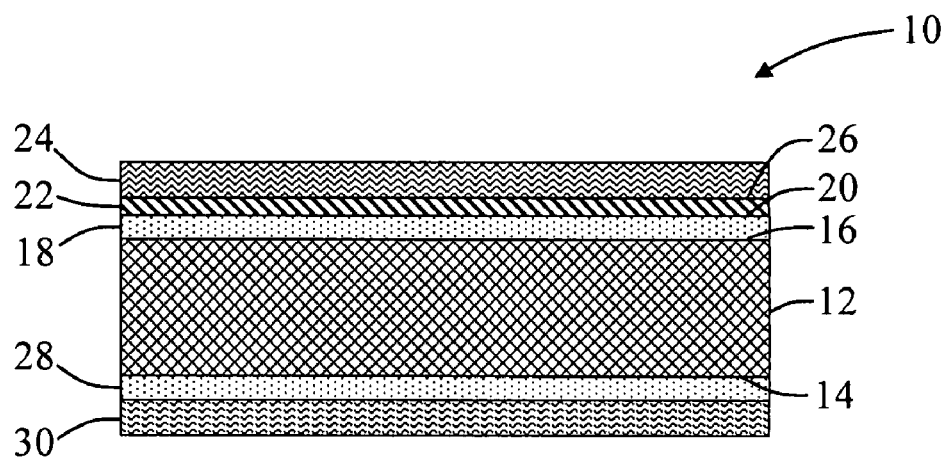
FIG. 1 is a cross sectional schematic illustration of a decorative interior panel in accordance with an embodiment of the present invention.

Referring to the drawings, FIG. 1 is a cross sectional schematic illustration of an exemplary decorative sound absorbing panel 10 that includes a porous core layer 12 having a first surface 14 and a second surface 16. A tie layer 18 connects a first surface 20 of a barrier layer 22 to second surface 16 of core layer 12. A fabric scrim layer 24 is bonded to a second surface 26 of barrier layer 22. An adhesive layer 28 attaches a decorative layer 30 to first surface 14 of core layer 12.

Core layer 12 is formed from a web made up of open cell structures formed by random crossing over of reinforcing fibers held together, at least in part, by one or more thermoplastic resins, where the void content of porous core layer 12 ranges in general between about 5% and about 95% and in particular between about 30% and about 80% of the total volume of core layer 12. In an another embodiment, porous core layer 12 is made up of open cell structures formed by random crossing over of reinforcing fibers held together, at least in part, by one or more thermoplastic resins, where about 40% to about 100% of the cell structure are open and allow the flow of air and gases through. Core layer 12 has a density in one embodiment of about 0.2 gm/cc to about 1.8 gm/cc and in another embodiment about 0.3 gm/cc to about 1.0 gm/cc. Core layer 12 is formed using known manufacturing process, for example, a wet laid process, an air laid process, a dry blend process, a carding and needle process, and other known process that are employed for making non-woven products. Combinations of such manufacturing processes are also useful. Core layer 12 includes about 20% to about 80% by weight fibers having a high tensile modulus of elasticity and an average length of between about 7 and about 200 mm, and about 20% to about 80% by weight of a wholly or substantially unconsolidated fibrous or particulate thermoplastic materials, where the weight percentages are based on the total weight of core layer 12 In another embodiment, core layer includes about 35% to about 55% by weight fibers. The web is heated above the glass transition temperature of the thermoplastic resins on core layer 12 to substantially soften the plastic materials and is passed through one or more consolidation devices, for example nip rollers, calendaring rolls, double belt laminators, indexing presses, multiple daylight presses, autoclaves, and other such devices used for lamination and consolidation of sheets and fabrics so that the plastic material can flow and wet out the fibers. The gap between the consolidating elements in the consolidation devices are set to a dimension less than that of the unconsolidated web and greater than that of the web if it were to be fully consolidated, thus allowing the web to expand and remain substantially permeable after passing through the rollers. In one embodiment, the gap is set to a dimension about 5% to about 10% greater than that of the web if it were to be fully consolidated. A fully consolidated web means a web that is fully compressed and substantially void free. A fully consolidated web would have less than 5% void content and have negligible open cell structure.

A high tensile modulus indicates a tensile modulus substantially higher than that of a consolidated sheet which could be formed from the web structure. Fibers falling into this category include metal, metalized inorganic, metalized synthetic, glass, graphite, carbon and ceramic fibers and fibers such as the aramid fibers sold under the trade names Kevlar and Nomex, and generally includes any fiber having a tensile modulus higher than about 10,000 Mega Pascals at room temperature and pressure.

Particulate plastic materials include short plastics fibers which can be included to enhance the cohesion of the web structure during manufacture. Bonding is affected by utilizing the thermal characteristics of the plastic materials within the web structure. The web structure is heated sufficiently to cause the thermoplastic component to fuse at its surfaces to adjacent particles and fibers.

In one embodiment, individual reinforcing fibers should not on the average be shorter than about 7 millimeters, because shorter fibers do not generally provide adequate reinforcement in the ultimate molded article. Also, fibers should not on average be longer than about 200 millimeters since such fibers are difficult to handle in the manufacturing process.

In one embodiment, glass fibers are used, and in order to confer structural strength the fibers have an average diameter between about 7 and about 22 microns. Fibers of diameter less than about 7 microns can easily become airborne and can cause environmental health and safety issues. Fibers of diameter greater than about 22 microns are difficult to handle in manufacturing processes and do not efficiently reinforce the plastics matrix after molding.

In one embodiment, the thermoplastics material is, at least in part, in a particulate form. Suitable thermoplastics include, but are not limited to, polyethylene, polypropylene, polystyrene, acrylonitrylstyrene, butadiene, polyethyleneterephthalate, polybutyleneterephthalate, polybutyleneterachlorate, and polyvinyl chloride, both plasticised and unplasticised, and blends of these materials with each other or other polymeric materials. Other suitable thermoplastics include, but are not limited to, polyarylene ethers, thermoplastic polyesters, acrylonitrile-butylacrylate-styrene polymers, amorphous nylon, as well as alloys and blends of these materials with each other or other polymeric materials. It is anticipated that any thermoplastics resin can be used which is not chemically attacked by water and which can be sufficiently softened by heat to permit fusing and/or molding without being chemically or thermally decomposed.

In one embodiment, the plastic particles need not be excessively fine, but particles coarser than about 1.5 millimeters are unsatisfactory in that they do not flow sufficiently during the molding process to produce a homogenous structure. The use of larger particles can result in a reduction in the flexural modulus of the material when consolidated. In one embodiment, the plastics particles are not more than about 1 millimeter in size.

Barrier layer 22 can be formed from any suitable non-permeable thermoplastic material having a melting temperature that is significantly higher than the thermoplastic material of core layer 12. Some suitable non-permeable thermoplastic materials include, but are not limited to, polyolefinic resins such as polyethylene, polypropylene and the like; polystyrene, polyvinyl chloride, polyethylene terephthalate, polycarbonate, polyamide, polyacetal and copolymers composed mainly of these resins, for example, ethylene-vinyl chloride copolymer, ethylene-vinyl acetate copolymer, styrene-butadiene-acrylonitrile copolymer and the like, and grafted products thereof; thermoplastic elastomers such as EPM, EPDM and the like; as well as polymer alloys and blends of these materials with each other or other polymeric materials.

Tie layer 18 is formed from a thermoplastic material. The thermoplastic material of tie layer 18 can be any suitable resin that adheres well to core layer 12 and barrier layer 22. The adhesion of tie layer 18 should be substantially unchanged during the life of panel 10 after it is subjected to processing conditions that include heat, humidity, and thermal cycling from about −40° C. to about 90° C. Suitable thermoplastic resins include, but are not limited to, polyolefinic resins such as polyethylene, polypropylene and the like; polystyrene, polyvinyl chloride, polyethylene terephthalate, polycarbonate, polyamide, polyacetal and copolymers formed from these resins, and grafted products thereof; thermoplastic elastomers such as EPM, EPDM and the like; as well as polymer alloys and blends of these materials with each other or other polymeric materials.

Fabric layer 24 is formed from a non-woven fabric, a woven fabric, or a combination of woven and non-woven fabrics. In one embodiment, fabric layer 24 is a fabric scrim formed from a non-woven fabric manufactured via wet laid, air laid, spunbond, and spunlace processes. Fabric layer 24 includes fabric made from organic fibers, inorganic fibers, synthetic fibers, and combinations thereof. Fabric layer 24 includes fibers made from, for example glass, carbon, polyacrylonitrile, aramid, poly(p-phenylene-benzobisoxazole), poly(ether-imide), poly(phenylene sulfide), polyolefinic resins for, example, polyethylene, polypropylene and the like, polystyrene, polyvinyl chloride, polyethylene terephthalate, polycarbonate, polyacetal and the like, copolymers formed mainly of these resins, for example, ethylene-vinyl chloride copolymer, ethylene-vinyl acetate copolymer, styrenebutadiene-acrylonitrile copolymer and the like, and grafted products thereof; thermoplastic elastomers such as EPM, EPDM and the like, polymer alloys or a blend of these resins, thermosetting resin fibers such as phenol and the like, natural fibers such as pulp, cotton and the like, and a blend of these fibers.

Decorative layer 30 is attached to first surface 14 of core layer 12 by adhesive layer 28 which is formed by a thermoplastic film having a monolayer or a multilayer construction. The thermoplastic film of adhesive layer 28 can be any suitable resin having a melting point lower than the melting point of the thermoplastic resin of core layer 12. Suitable thermoplastic resins include, but are not limited to, polyolefinic resins such as polyethylene, polypropylene and the like, polystyrene, polyvinyl chloride, polyethylene terephthalate, polycarbonate, polyamide, polyacetal and copolymers formed from these resins, and grafted products thereof, thermoplastic elastomers such as EPM, EPDM and the like, as well as polymer alloys and blends of these materials with each other or other polymeric materials. Further, adhesive layer 28 can be any suitable pressure sensitive adhesive.

Figure 2:
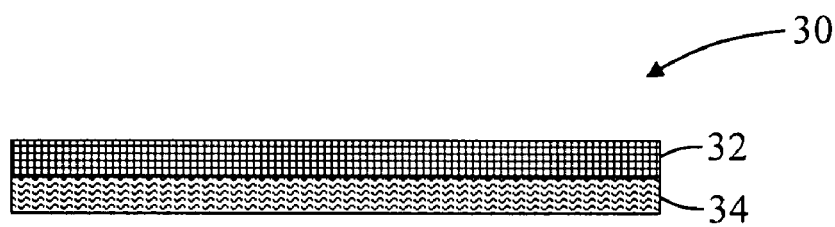
FIG. 2 is a cross sectional schematic illustration of an embodiment of the decorative layer of decorative interior panel shown FIG. 1.
Figure 3:
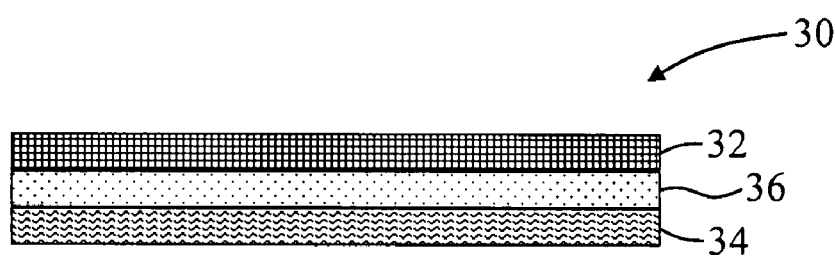
FIG. 3 is a cross sectional schematic illustration of another embodiment of the decorative layer of decorative interior panel shown FIG. 1.

Decorative layer 30, in one embodiment shown in FIG. 1, is a thermoplastic film of, for example, polyvinyl chloride, polyolefin, thermoplastic polyester, thermoplastic elastomer, or the like. In another embodiment, shown in FIG. 2, decorative layer 30 is a multilayered structure that includes a foam core 32 formed from, for example, polypropylene, polyethylene, polyvinyl chloride, polyurethane, and the like. Fabric 34 is bonded to foam core 32, for example, woven fabrics made from natural and synthetic fibers, organic fiber nonwoven fabric after needle punching or the like, raised fabric, knitted goods, flocked fabric and the like. In another embodiment shown in FIG. 3, fabric 34 is bonded to foam core 32 with a thermoplastic adhesive 36, including pressure sensitive adhesives and hot melt adhesives, for example, polyamides, modified polyolefins, urethanes and polyolefins. In another embodiment, adhesive layer 36 is replaced with a non-woven batting formed from at least one polyester material and polyamide fibers. Decorative layer 30 is formed from materials that can withstand processing temperatures, for example, thermal forming temperatures, of about 100° C. to about 250° C.

Barrier layer 22, fabric layer 24, and decorative layer 30 are laminated to core layer 12 by any suitable lamination process using heat and/or pressure, for example using nip rollers or a lamination machine. Barrier layer 22, fabric layer 24, and decorative layer 30 are laminated to core 12 after it has been formed, and in one embodiment, Barrier layer 22, fabric layer 24, and decorative layer 30 are laminated to core layer 12 before it has been cut into sheets of predetermined size. In another embodiment, Barrier layer 22, fabric layer 24, and decorative layer 30 are laminated to core layer 12 after it has been cut into sheets. In one embodiment, the temperature of the lamination process is greater than the glass transition temperature of the thermoplastic resins of barrier layer 22 and core layer 12, for example, greater than about 25° C.

In one embodiment, tie layer 18, barrier layer 22, and fabric layer 24 are first formed as a first subassembly and then this subassembly is laminated to core layer 12. In another embodiment, decorative layer 30 and adhesive layer 28 are formed as a second subassembly and then this subassembly is laminated to core layer 12. In another embodiment, these first and second subassemblies are laminated to core layer 12 simultaneously.

The decorative sound absorbing panels described above can be used in, but not limited to, building infrastructure, automotive headliners, door modules, load floors, side wall panels, ceiling panels, cargo liners, office partitions, and other such applications that are currently made with polyurethane foam, natural fiber composites, polyester fiber filled multi-layered composites, and thermoplastic sheets. The decorative sound absorbing panels can be molded into various articles using methods known in the art including, for example, pressure forming, thermal forming, thermal stamping, vacuum forming, compression forming, and autoclaving. The combination of high stiffness to weight ratio, ability to be thermoformed with deep draw sections, end of life recyclability, and acoustics make the porous fiber-reinforced thermoplastic composite a more desirable product than the products currently being used.

While the invention has been described in terms of various specific embodiments, those skilled in the art will recognize that the invention can be practiced with modification within the spirit and scope of the claims.

What is claimed is:

1. A multi-layered fiber reinforced thermoplastic sound absorbing panel comprising:
    a non-foam porous fiber reinforced thermoplastic core layer comprising a thermoplastic material and from about 20 weight percent to about 80 weight percent fibers, said core layer having a first surface and a second surface;
    a tie layer comprising a thermoplastic material, said tie layer covering said second surface of said core layer;
    an air impermeable barrier layer covering said tie layer, said barrier layer comprising a non-permeable thermoplastic material having a melting temperature higher than the melting temperature of said core layer thermoplastic material, said tie layer bonding said barrier layer to said core layer;
    a fabric layer comprising at least one of a non-woven fabric and a woven fabric bonded to said barrier layer, said fabric layer forming an outer surface of said panel; and
    a decorative layer bonded to said first surface of said core layer.

2. A multi-layered fiber reinforced thermoplastic panel in accordance with claim 1 wherein said decorative layer comprises a thermoplastic film comprising at least one of polyvinyl chloride, a polyolefin, a thermoplastic polyester, and a thermoplastic elastomer.

3. A multi-layered fiber reinforced thermoplastic panel in accordance with claim 1 wherein said decorative layer comprises at least one of woven fabric and non-woven fabric comprising at least one of polyvinyl chloride, a polyolefin, a thermoplastic polyester, and a thermoplastic elastomer.

4. A multi-layered fiber reinforced thermoplastic panel in accordance with claim 1 wherein said decorative layer comprises a bi-layered laminate comprising a foam core and a woven or non-woven fabric, said foam core comprising at least one of polypropylene, polyethylene, polyvinyl chloride, and polyurethane.

5. A multi-layered fiber reinforced thermoplastic panel in accordance with claim 1 wherein said decorative layer comprises a tri-layered laminate comprising a foam core, a thermoplastic adhesive, and woven or non-woven fabric, said foam core comprising at least one of polypropylene, polyethylene, polyvinyl chloride, and polyurethane.

6. A multi-layered fiber reinforced thermoplastic panel in accordance with claim 1 wherein said decorative layer comprises a tri-layered laminate comprising a foam core, a non-woven batting, and woven or non-woven fabric, said foam core comprising at least one of polypropylene, polyethylene, polyvinyl chloride, and polyurethane, said non-woven batting comprising at least one polyester material and polyamide fibers.

7. A multi-layered fiber reinforced thermoplastic panel in accordance with claim 1 further comprising a thermoplastic adhesive layer positioned between said first surface of said core layer and said decorative layer, said thermoplastic adhesive layer bonding said decorative layer to said core layer.

8. A multi-layered fiber reinforced thermoplastic panel in accordance with claim 7 wherein said thermoplastic adhesive layer comprises at least one layer of thermoplastic adhesive material.

9. A composite sheet comprising:
   a non-foam permeable core comprising discontinuous fibers bonded together with a thermoplastic resin, said permeable core having a density from about 0.2 gm/cc to about 1.8 gm/cc, said permeable core including a first surface and a second surface;
   an air impermeable barrier layer covering said second surface of said permeable core, said barrier layer comprising a non-permeable thermoplastic material;
   a fabric layer comprising at least one of a non-woven fabric and a woven fabric bonded to said barrier layer, said fabric layer forming an outer surface of said composite sheet;
   a decorative layer bonded to said first surface of said permeable core.

10. A composite sheet in accordance with claim 9 further comprising a tie layer comprising a thermoplastic material having a melting temperature lower than the melting temperature of said barrier layer, said tie layer covering said second surface of said permeable core, said tie layer bonding said barrier layer to said permeable core.

11. A composite sheet in accordance with claim 9 wherein said decorative layer comprises a thermoplastic film comprising at least one of polyvinyl chloride, a polyolefin, a thermoplastic polyester, and a thermoplastic elastomer.

12. A composite sheet in accordance with claim 9 wherein said decorative layer comprises at least one of a woven fabric and a non-woven fabric comprising at least one of polyvinyl chloride, a polyolefin, a thermoplastic polyester, and a thermoplastic elastomer.

13. A composite sheet in accordance with claim 9 wherein said decorative layer comprises a bi-layered laminate comprising a foam core and a woven or non-woven fabric, said foam core comprising at least one of polypropylene, polyethylene, polyvinyl chloride, and polyurethane.

14. A composite sheet in accordance with claim 9 wherein said decorative layer comprises a tri-layered laminate comprising a foam core, a thermoplastic adhesive, and woven or non-woven fabric, said foam core comprising at least one of polypropylene, polyethylene, polyvinyl chloride, and polyurethane.

15. A composite sheet in accordance with claim 9 wherein said decorative layer comprises a tri-layered laminate comprising a foam core, a non-woven batting, and woven or non-woven fabric, said foam core comprising at least one of polypropylene, polyethylene, polyvinyl chloride, and polyurethane, said non-woven batting comprising at least one polyester material and polyamide fibers.

16. A composite sheet in accordance with claim 9 further comprising a thermoplastic adhesive layer positioned between said first surface of said permeable core and said decorative layer, said thermoplastic adhesive layer bonding said decorative layer to said permeable core.

17. A composite sheet in accordance with claim 16 wherein said thermoplastic adhesive layer comprises at least one layer of thermoplastic adhesive material.

18. A method of manufacturing a porous fiber-reinforced thermoplastic sheet, said method comprising:
   providing a non-foam porous fiber-reinforced thermoplastic sheet having a first and a second surface and comprising at least one porous core layer comprising a thermoplastic material and from about 20 weight percent to about 80 weight percent fibers;
   bonding an air impermeable barrier layer to the second surface of the porous fiber-reinforced thermoplastic sheet, the barrier layer comprising a non-permeable thermoplastic material;
   bonding a decorative layer to the first surface of the porous fiber-reinforced thermoplastic sheet; and
   bonding a fabric layer to the barrier layer.

19. A method in accordance with claim 18 wherein said bonding a barrier layer comprises:
   positioning an adhesive tie layer between the barrier layer and second surface of the porous fiber-reinforced thermoplastic sheet; and
   laminating the barrier layer and tie layer to the porous fiber-reinforced thermoplastic sheet.

20. A method in accordance with claim 18 wherein said bonding a barrier layer comprises:
   forming a sub-assembly comprising a tie layer, the barrier layer, and the fabric layer; and
   laminating the sub-assembly to the second surface of the porous fiber-reinforced thermoplastic sheet.

21. A method in accordance with claim 18 wherein the decorative layer comprises a foam core and a woven or non-woven fabric, the foam core comprising at least one of polypropylene, polyethylene, polyvinyl chloride, and polyurethane.

22. A method in accordance with claim 18 wherein the decorative layer comprises a foam core, a thermoplastic adhesive, and woven or non-woven fabric, the foam core comprising at least one of polypropylene, polyethylene, polyvinyl chloride, and polyurethane.

23. A method in accordance with claim 18 wherein the decorative layer comprises a thermoplastic film comprising at least one of polyvinyl chloride, a polyolefin, a thermoplastic polyester, and a thermoplastic elastomer.

24. A method in accordance with claim 18 wherein the decorative layer comprises at least one of a woven fabric and a non-woven fabric comprising at least one of polyvinyl chloride, a polyolefin, a thermoplastic polyester, and a thermoplastic elastomer.

* * * * *